United States Patent [19]

Bergman

[11] Patent Number: 4,679,050
[45] Date of Patent: Jul. 7, 1987

[54] PULSE RADAR APPARATUS

[75] Inventor: Jan Bergman, Haaksbergen, Netherlands

[73] Assignee: Hollandse Signaalapparaten B.V., Hengelo, Netherlands

[21] Appl. No.: 801,367

[22] Filed: Nov. 25, 1985

[30] Foreign Application Priority Data

Dec. 11, 1984 [NL] Netherlands .......................... 8403758

[51] Int. Cl.[4] .............................................. G01J 13/00
[52] U.S. Cl. ..................... 342/196; 364/726; 342/137
[58] Field of Search ................. 342/196, 195, 137; 364/726

[56] References Cited

U.S. PATENT DOCUMENTS

| 3,480,953 | 11/1969 | Shreve | 342/202 |
|---|---|---|---|
| 3,491,360 | 1/1970 | Stoorvogel | 342/94 |
| 3,610,901 | 10/1971 | Lynch | 342/196 |
| 3,706,990 | 12/1972 | Carre | 342/137 |
| 3,828,348 | 8/1974 | Murray, Jr. | 342/160 |
| 3,855,593 | 12/1974 | Van Hijfte et al. | 342/94 |
| 4,106,019 | 8/1978 | Alexander et al. | 342/137 |
| 4,214,242 | 7/1980 | Colin | 342/202 |
| 4,234,880 | 11/1980 | Klemm | 342/196 |
| 4,524,358 | 6/1985 | Bergman et al. | 342/162 |
| 4,524,360 | 6/1985 | Bergman et al. | 342/196 |

OTHER PUBLICATIONS

Electrical Communication, vol. 46, No. 4, 1971, pp. 297-282, Bosc et al.

Primary Examiner—Thomas H. Tarcza
Assistant Examiner—Donald E. Hayes, Jr.
Attorney, Agent, or Firm—Robert J. Kraus

[57] ABSTRACT

Described is a pulse radar apparatus having a repetition period containing m wobbles. The pulse radar apparatus is provided with: a transmitting and receiving unit (2), whereby the received target echoes are sampled and digitized; an n-point DFT processing unit (3); a threshold circuit (4); and a cluster combiner circuit (5) comprising means to form a cluster covering one single target using the signals obtained from the threshold circuit (4). Due to the wobbles, additional information arises in the DFT spectra. From the range, azimuth, local maximum values of the DFT spectrum and the associated output channel number of the DFT processing unit (3), a classification unit (6) determines whether a target is a multiple-time-around target. The classification unit (6) is also able to determine the target doppler frequency, even if this frequency exceeds the average pulse repetition frequency.

2 Claims, 23 Drawing Figures

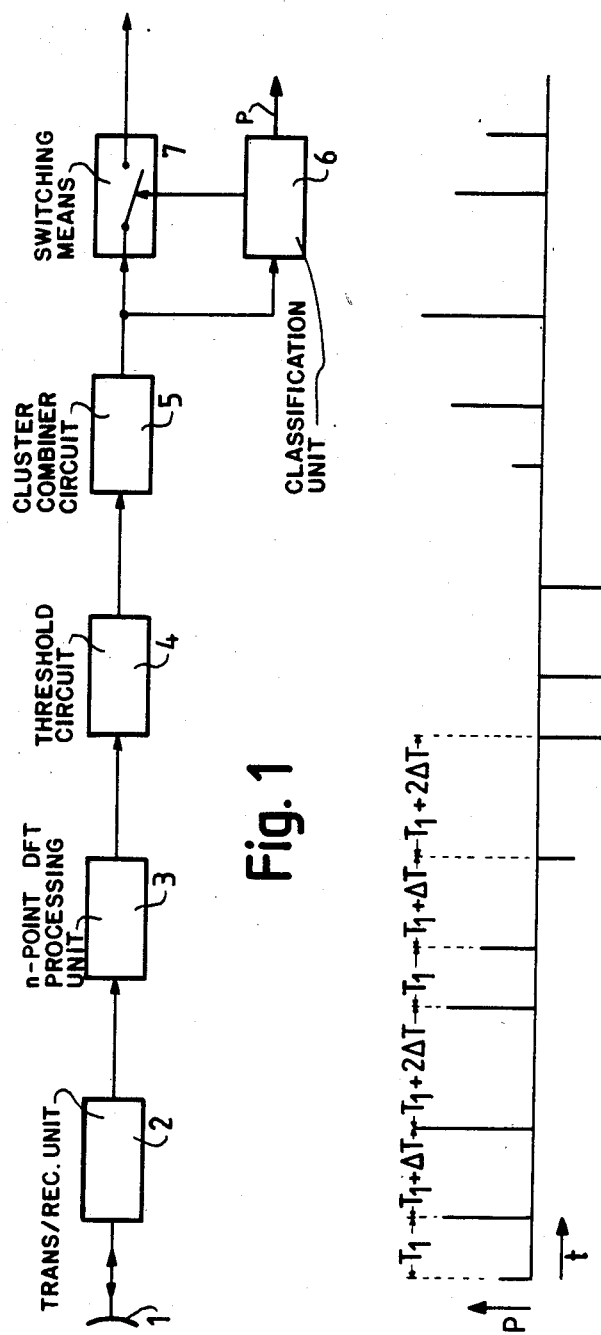

PULSE RADAR APPARATUS

BACKGROUND OF THE INVENTION

The invention relates to a pulse radar apparatus provided with a transmitting and receiving unit, whereby the received target echoes are sampled and digitised after detection. The apparatus includes an n-point DFT processing unit; a threshold circuit; and a cluster combiner circuit for combining radar cells, collectively covering one single target, to form a cluster from the signals obtained from the threshold circuit. The apparatus produces a signal representing the target covered by the cluster and hence the target range and azimuth.

Such a pulse radar apparatus is known from the European Pat. No. EP-A-0.057.949, (corresponding to U.S. Pat. No. 4,524,360) describing the presence of a cell classification unit between the threshold circuit and the cluster combiner circuit. This unit facilitates a preliminary distinction between first- and multiple-time-around echoes in the cells on account of the spectrum range, as here the first-time-around echoes, but the multiple-time-around echoes are not coherently detected. A final distinction between first- and multiple-time-around echoes is made in the cluster. This system is unsuitable in case of coherent or non-coherent detection of both the first- and the multiple-time-around echoes, the reason being that in such a case the spectrum range no longer shows any difference. In the situation where a target-representing signal is derived from a first- or a multiple-time-around echo, reference is hereinafter made to a first- or a multiple-time-around target.

The present invention has for its object to provide, irrespective of the fact of coherent or non-coherent detection of the first- or multiple-time-around echoes, means for determining whether the target-representing signal is derived from a first- or a multiple-time-around echo. The invention is charcterised in that: the pulse repetition period of the radar apparatus contains m wobbles; the cluster combiner circuit comprises means for determining the magnitude of the local maximum values present in the DFT spectrum covered by the target-representing signal as well as an indication which of the DFT-processor output channels produces the maximum values; and a classification unit connected to the cluster combiner circuit is incorporated for determining a target to be a multiple-time-around target. This determination is made subject to the conditions that: for the target-representing signals produced by the cluster combiner circuit the difference in the cluster-defined target ranges correspond or substantially correspond with a particular wobble period; the difference in aximuth of the clusters is within predefined narrow limits; the magnitudes of the local maximum values of the DFT spectra are equal or substantially equal to each other; and the local maximum values are present in either the same DFT-processor output channel or output channels differing in frequency from each other over a value of $(k/m)n$ times the bandwidth of the output channels concerned, where $k=1, 2, \ldots, m-1$.

It is also possible to extend the pulse radar apparatus according to the invention in a simple way in order that, if the classification unit has not defined a target as being a multiple-time-around target, this unit establishes the value of P from the ratio between the local maximum values, where $2^P$ is equal to the quotient of the doppler frequency and the pulse repetition frequency.

BRIEF DESCRIPTION OF THE DRAWING

The invention and its advantages will now be described with reference to the accompanying figures, of which:

FIG. 1 is a block diagram of an embodiment of the pulse radar apparatus according to the invention;

FIG. 6A represents an echo pulse train, where the pulse repetition period contains two wobbles;

FIG. 6B shows the DFT spectrum of FIG. 6A;

DESCRIPTION OF THE PREFERRED EMBODIMENT

Figure 2A:
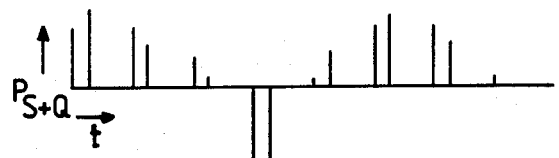
FIG. 2A represents an echo pulse train, where the pulse repetition period contains a wobble.

For the sake of simplicity, the pulse radar apparatus here described refers to a pulse repetition period containing one wobble. This does not affect the generality, as it permits of a fully analogous extension to pulse radar apparatus, whereby the pulse repetition period contains m wobbles to suppress k-time-around echoes, where $2 \leq k - l(m+1) \leq m+1$, and $l=0, 1, 2, \ldots$. In the pulse radar apparatus of FIG. 1 the radar antenna 1 is connected to a transmitting and receiving unit 2. The transmitting unit 2 is provided with a TWT, permitting coherent detection of both first- and second-time-around echoes. The receiving unit 2 produces echo signals having been sampled and digitised. The digitised signals are subsequently Fourier-transformed in an n-point DFT processor 3. That is, video data supplied from n successive radar scans and situated in one range bin is converted into n output signals in the n frequency output signals of the DFT processor. Such a conversion will hereinafter be designated by a DFT sweep. If the video data from radar sweeps $1, 2, 3, \ldots, n$ for all eligible range bins is converted into frequency data, the video data from radar sweeps $n-k'+1, n-k'+2, \ldots, 2n-k'$ for each of the eligible range bins is then converted into frequency data. In the above expression, $k'$ may assume the values $0, 1, 2, \ldots, n-1$. The successive DFT sweeps thus correspond with adjoining or more or less overlapping azimuth sectors. With each DFT sweep and each range bin the signals produced by the DFT processor 3 are supplied to threshold circuit 4 eliminating clutter and noise. The output signals of threshold circuit 4 are supplied to a cluster combiner circuit 5, comprising means for combining radar cells, collectively covering one single target, to form a cluster, using the signals obtained from the threshold circuit, for determining a signal representing the target covered by the cluster. Such a cluster combiner circuit is described in the cited European Patent Specification. From the signal obtained the cluster combiner circuit 5 also determines the target range and azimuth. Cluster combiner circuit 5 is capable of covering a multiplicity of targets.

Because of the coherent detection of both first- and second-time-around echoes, it is not possible to make a distinction between first- and second-time-around echoes on account of the relevant DFT spectrum range. According to the invention, a solution to this problem is found by changing the pulse repetition period T of the pulse radar apparatus after the emission of a radar pulse from $T=T_1$ to $T=T_2$, if the pulse repetition period last used was $T_1$ and vice versa. Hereinafter reference will be made to a pulse repetition period containing a wobble, where the wobble period is equal to $|T_1-T_2|=\Delta T$. Transmitting unit 2 contains means for applying a wobble to the pulse repetition period. This wobble enables to establish, on account of the target range and azimuth information from cluster combiner circuit 5, whether an echo is a first- or a second-time-around echo; in case of a second-time-around echo, the target range information from cluster combiner circuit 5 will assume two values with a mutual difference corresponding with the wobble time, whereas a first-time-around echo will yield the same or substantially the same range value with each detection. The azimuth value from cluster combiner circuit 5 will practically remain unchanged.

Figure 2B:
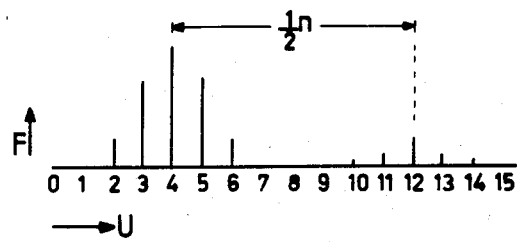
FIG. 2B shows the DFT spectrum of FIG. 2A.

For a pulse radar apparatus equipped with a DFT processor 3, the application of a wobble has the disadvantage that the DFT spectrum changes due to the wobble: the main spectrum of the received target echoes containing the doppler information is accompanied with a secondary spectrum whose local maximum value is at a distance of ½n times the bandwidth of the DFT processor output channels away from that of the main spectrum. In the description below, reference will simply be made to local maximum values with an interspace of ½n output channels, see also FIG. 2A showing an echo pulse train containing a wobble, and FIG. 2B showing the DFT spectrum of FIG. 2A. The absolute value F of the generally complex DFT spectrum is depicted in FIGS. 2B, 3D 3E, 6B and 7E. It is further assumed that a 16-point DFT is applied, where the 16 output channels U are consecutively numbered from 0 to 15.

The above disadvantage of the creation of a secondary spectrum is the reason that up to now no wobble has been applied in pulse radar apparatus provided with a DFT processor 3. It is however a matter of surprise that, in case of a first-time-around echo, the main spectrum does not change significantly through the presence of the secondary spectrum if the wobble time is short enough; in such a situation the secondary spectrum appears to be much smaller than the main spectrum. Moreover, with the DFT spectrum and the target range and azimuth information from cluster combiner circuit 5 a better distinction can be made between first- and second-time-around echoes, seeing that on account of the target range and azimuth information from combiner circuit 5 it is possible that two different targets are defined as being one second-time-around target if these targets, viewed from the radar antenna, are behind each other at a range corresponding with the wobble period. As for a second-time-around echo the magnitude of the secondary spectrum in the DFT spectrum is equal to that of the main spectrum, see FIG. 3E, while the secondary spectrum is a distance of ½n output channels away from the main spectrum, this fact can be utilised according to the invention to prevent the taking of a wrong decision as to the targets being at a range corresponding with the wobble period. This may be achieved by comparing main and secondary spectra of the two targets and, to decide that "an echo is a second-time-around echo", attaching two additional conditions that these spectra are equivalent and that they are a distance of ½n or zero output channels apart.

Figure 3A:
FIGS. 3A, 3B and 3C represent echo pulse trains useful in illustrating the operation of the pulse radar apparatus.
Figure 3B:
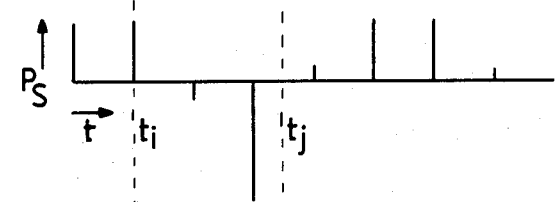
Figure 3C:
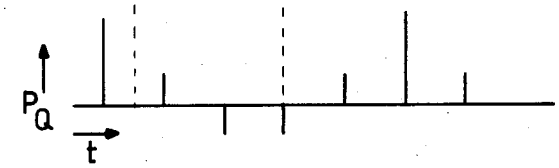
Figure 3D:
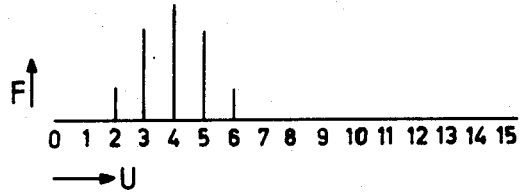
FIG. 3D shows the DFT spectrum of FIG. 3A.
Figure 3E:
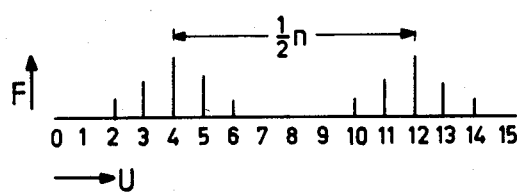
FIG. 3E shows the DFT spectrum of FIGS. 3B and 3C.
Figure 4A:
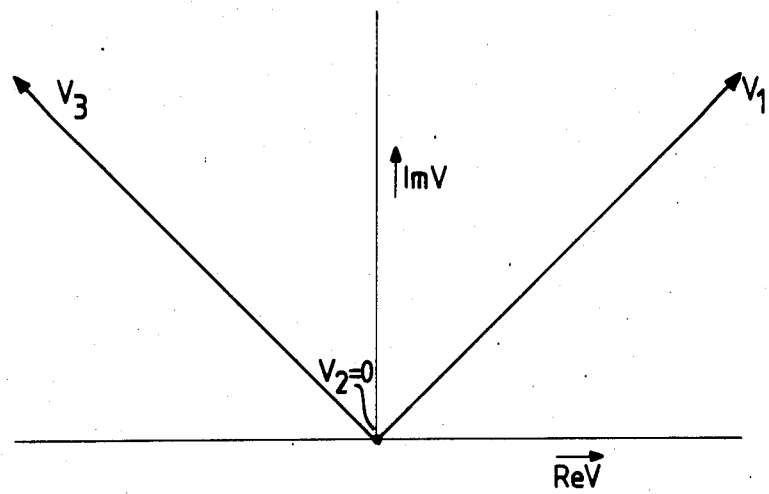
FIGS. 4A, 4B, 5A and 5B represent vector diagrams useful in explaining the specific nature of the above DFT spectrum.

The creation of a secondary spectrum in case of first-time-around echoes due to a wobble may be explained as follows. Generally after an n-point DFT a train of n echo pulses P at an interval T, as obtained through the sampling process, will give a spectrum as shown in FIG. 3D. The echo pulse train of FIG. 3A may be conceived to be the sum of two echo pulse trains S and Q, as illustrated in FIGS. 3B and 3C. The absolute value of the DFT spectrum of echo pulse train S is indicated in FIG. 3E. Two equivalent spectra are formed, each being a distant of ½n output channels apart. This is explained with the aid of FIG. 4A, in which a signal vector V depicts the magnitude and phase of an echo pulse P in the complex plane, where $ReV=P$. In FIG. 4A the first three signal vectors of echo pulse train S in FIG. 3B are set out in the complex plane. According to the echo pulse train S of FIG. 3B, the second signal vector is here the zero vector. The first signal vector $V_1$ can be conceived to be the sum of two signal vectors $V_{1a}=V_{1b}=\frac{1}{2}V_1$. The same applies to $V_3$. The second signal vector may be regarded as the sum of two signal vectors $V_{2a}=-V_{2b}$, where $|\frac{1}{2}V_1|=|V_{2a}|$; see FIG. 4B.

Figure 4B:
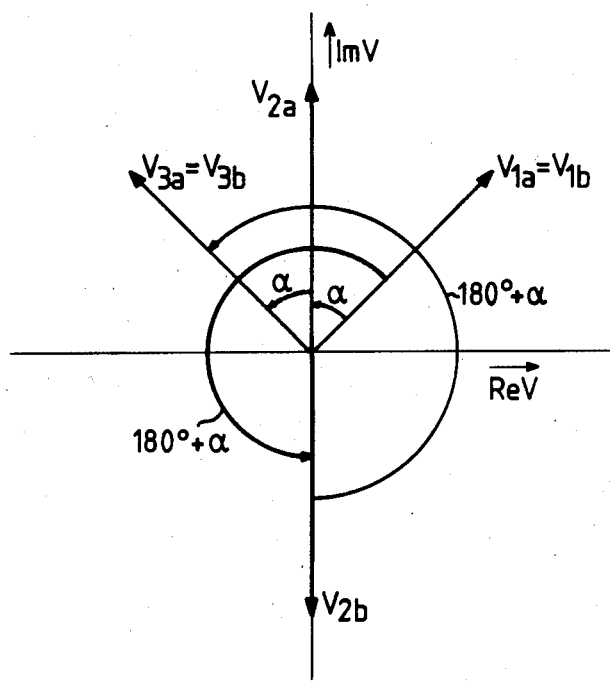

From FIG. 4B it is seen that the angular difference between successive a-vectors is $\alpha°$ and that the angular difference between successive b-vectors is $180°+\alpha$. The angular difference of successive a- and b-vectors is thus 180°, corresponding with a distance of ½n filter channels between the main and the secondary spectra in the complex DFT spectrum, as the a-vectors determine the main spectrum and the b-vectors the secondary spectrum. The spectrum of the echo pulse train Q can be regarded in the same way. Echo pulse train Q corresponds with echo pulse train S shifted over a period T. This means that there is a phase difference between the complex DFT spectrum of echo pulse trains S and Q.

Figure 5A:
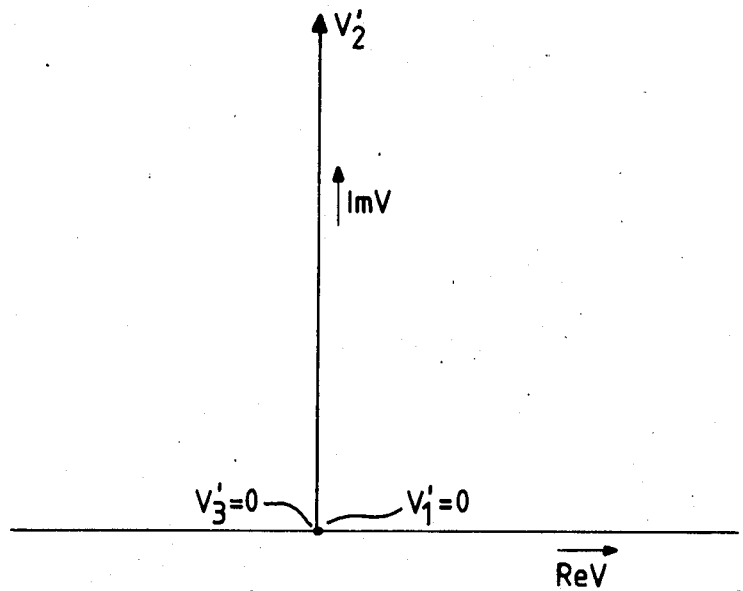
Figure 5B:
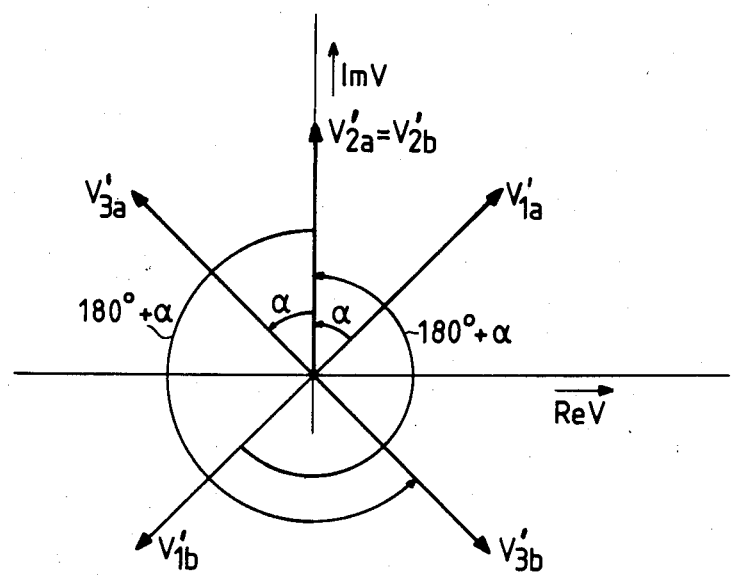

This can be demonstrated as follows. In FIG. 5A the first three signal vectors of echo pulse train Q are set out. According to echo pulse train Q, the first and the third signal vectors, here designated $V_1'$ and $V_3'$, are equal to the zero vector. Signal vector $V_2'$ can be regarded as the sum of the two signal vectors $V_{2a}'=V_{2b}'=\frac{1}{2}V_2'$. The first and the third signal vectors can be regarded as the sum of two signal vectors $V_{1a}'=-V_{1b}'$ and $V_{3a}'=-V_{3b}'$, respectively, where $|V_{1a}'|-|V'_{3a}|=|\frac{1}{2}V_2'|$; see FIG. 5B. FIG. 5B shows that the angular different between successive a-vectors is $\alpha°$ and that between successive b-vectors $180°+\alpha$. The angular difference of successive a- and b-vectors is thus 180°, corresponding in the complex DFT spectrum with a range difference of ½n output channels between the main spectrum from the a-vectors and the secondary spectrum from the b-vectors. By comparing FIGS. 4B and 5B, it is seen that $V_{1a}=V_{1a}'$, $V_{2a}=V_{2a}'$ and $V_{3a}=V_{3a}'$, so that the complex main spectra of echo pulse trains S and Q, respectively, are equivalent, i.e. equal in magnitude and in phase. It is also seen that all b-vectors of FIG. 5B are rotated through 180° with respect to the corresponding b-vectors of FIG. 4B, so that the two complex secondary spectra of echo pulse trains S and Q, respectively, are equivalent as concerns their absolute value, but they differ 180° in phase.

Since the sum of the two DFT spectra of echo pulse trains S and Q has to yield the DFT spectrum of FIG. 3D, i.e. the DFT spectrum of echo pulse trains S+Q, this means that, as shown, the two secondary spectra compensate each other, because of a phase difference of 180°. The sum of the two main spectra provides the spectrum of FIG. 3D. If echo pulse train Q is not shifted exactly by a distance T with respect to echo pulse train S, this means that there is a wobble in the complete pulse train, see FIG. 2A. This implies that a small phase shift is incurred in the complex DFT spectrum of echo pulse train Q. If now the two spectra of echo pulse trains S and Q are added to the spectrum of the pulse train in FIG. 2A,, the two secondary spectra will no longer compensate each other, because the phase difference of the two latter spectra is no longer exactly 180°. Thus a small secondary spectrum arises in the spectrum of the echo pulse train in FIG. 2A. The two main spectra of pulse trains S and Q are no longer wholly in phase; hence, after summation of the two latter spectra the magnitude of the spectrum obtained is not a maximum. To sum up the above: a relatively small secondary spectrum has resulted in the spectrum of the echo pulse train in FIG. 2a, whereas the main spectrum has slightly decreased. The smaller the wobble period, the smaller the change in the phase difference, the smaller the secondary spectrum, the greater the main spectrum. If the wobble period is sufficiently short, the change in the main spectrum is not significant. The above applies to a first-time-around echo.

In case of a second-time-around echo, the echoes are omitted alternately, since 50% of the echoes are detected at a range $R_1$ and 50% at a range $R_2$, where the difference in range, $|R_1-R_2|$, corresponds with the wobble time $\Delta T$, see FIG. 2A. The echo pulse train type of a second-time-around echo thus corresponds with one of the pulse trains S or Q of FIG. 3. The associated spectrum of a second-time-around echo therefore corresponds with the spectrum of FIG. 3E; here the main and secondary spectra are equal, unlike the spectrum of a first-time-around echo. This explains the spectra of first- and second-time-around echoes, whereby a wobble may or may not be applied to the pulse repetition period.

To apply the two additional conditions using the properties of the DFT spectrum, the cluster combiner circuit 5 of the pulse radar apparatus comprises means for determining the magnitude of local maximum values and the associated output channel number from the DFT spectrum defined by the target-representing signal. From the range, azimuth, local maximum values, and the associated output channel number of the target or targets, as determined by cluster combiner circuit 5, the classification unit 6 decides whether a target is a second-time-around target. The decision "target is a second-time-around target" is positive for the detection of two targets whose mutual distance corresponds or substantially corresponds with the wobble time, whose azimuths are equal or substantially equal, where the magnitude of the local maximum values of the DFT spectra is equal or substantially equal and where the range difference in the filter channel of the local maximum values is equal or substantially equal to zero or $\frac{1}{2}n$. If classification unit 6 decides that a target is a second-time-around target, classification unit 6 opens switch 7 to block the passage of the target-representing signal emitted by combiner circuit 5 for further processing. It should be noted that 2+2l time-around echoes are suppressed as well, where l=1, 2, 3, 4, . . . , because the pulse repetition period corresponds with two transmitter pulses.

The pulse radar apparatus described above can simply be extended for the suppression of third-time-around echoes, in addition to second-time-around echoes. To this effect, provided the pulse repetition period of the last emitted radar pulse $T=T_1$, the pulse repetition period T after the emission of the radar pulse is changed from $T=T_1$ into $T=T_1+\Delta T$ and after the emission of the next radar pulse from $T=T_1+\Delta T$ into $T=T_1+\Delta T'$, where $\Delta T'=2\Delta T$ for reasons of simplicity. This cycle is subsequently repeated. Hereinafter this will be designated by a pulse repetition period containing two wobbles, where the wobble times are equal to $\Delta T$ and $2\Delta T$. To illustrate the analogy with a pulse radar apparatus where one wobble is applied to the pulse repetition period, the pulse radar apparatus described below has a pulse repetition period containing two wobbles.

Transmitting unit 2 is now provided with means for applying two wobbles to the pulse repetition period. On account of the target range and azimuth determined by cluster combiner circuit 5, the "wobbles" enable to determine whether an echo is, on the one hand, a first-time-around echo or, on the other hand, a second- or a third-time-around echo; the second- or third-time-around echoes will hereinafter be designated second-/third-time-around echoes. The above distinction can be made, as in case of a second/third-time-around echo the target range determined by combiner circuit 5 will assume three values with mutual distances corresponding with the wobble times, whereas in case of a first-time-around echo the same or substantially the same range will be found for each of these echoes. The target azimuth determined by combiner circuit 5 will hardly change.

Also in this case, the application of the wobbles in a pulse radar apparatus provided with a DFT processor 3 has the disadvantage that the DFT spectrum is subject to change under the influence of the wobbles: besides the main spectrum of the received target echoes containing the doppler information, two secondary spectra arise. The neighbouring relative maximum values of the main and secondary spectra are $\frac{1}{3}n$ or almost $\frac{1}{3}n$ output channels apart.; see FIG. 6A showing an echo pulse train provided with two wobbles and see also FIG. 6B for the associated DFT spectrum. Furthermore, a 15-point DFT is assumed, the 15 output channels being numbered consecutively from 0 to 14.

It is again surprising that the main spectrum, in the case of a first-time-around echo, does not change significantly through the presence of the secondary spectra if the wobble times are sufficiently short; the secondary spectra are found to be much smaller than the main spectrum. Besides, the DFT spectrum, together with the target range and azimuth determined by combiner circuit 5, enables to make a better distinction between first- and second/third-time-around echoes. For it is possible that, on account of the target range and azimuth determined by combiner circuit 5, three different targets are defined as being one second/third-time-around target if these targets, as viewed from the radar antenna, are behind each other at ranges corresponding with the wobble times. As for a second/third-time-around echo the secondary spectra in the DFT spectrum are equal in magnitude to the main spectrum, see FIG. 3E, and are respectively $\frac{1}{3}$n and $\frac{2}{3}$n output channels away from the main spectrum, this fact can be utilised according to the invention to prevent a faulty decision being made about the three targets at ranges corresponding with the wobble times. This may be achieved by comparing main and secondary spectra of the three targets and, to decide that "the echo is a second/third-time-around echo", by setting two additional conditions that these spectra are equal to each other and that they are $\frac{2}{3}$n and $\frac{1}{3}$n or zero output channels apart.

Figure 7A:
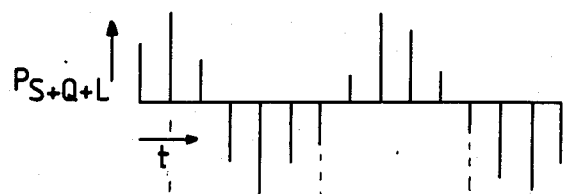
FIGS. 7A, 7B, 7C and 7D represent echo pulse trains useful in illustrating the operation of a pulse radar apparatus with a pulse repetition period containing two wobbles.
Figure 7B:
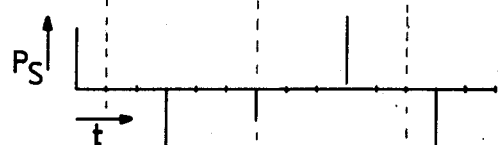
Figure 7C:
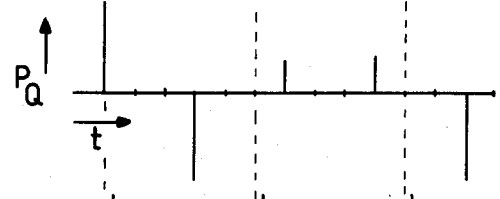
Figure 7D:
Figure 7E:
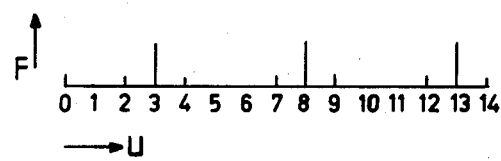
FIG. 7E shows the DFT spectrum of FIGS. 7B, 7C and 7D.
Figure 8A:
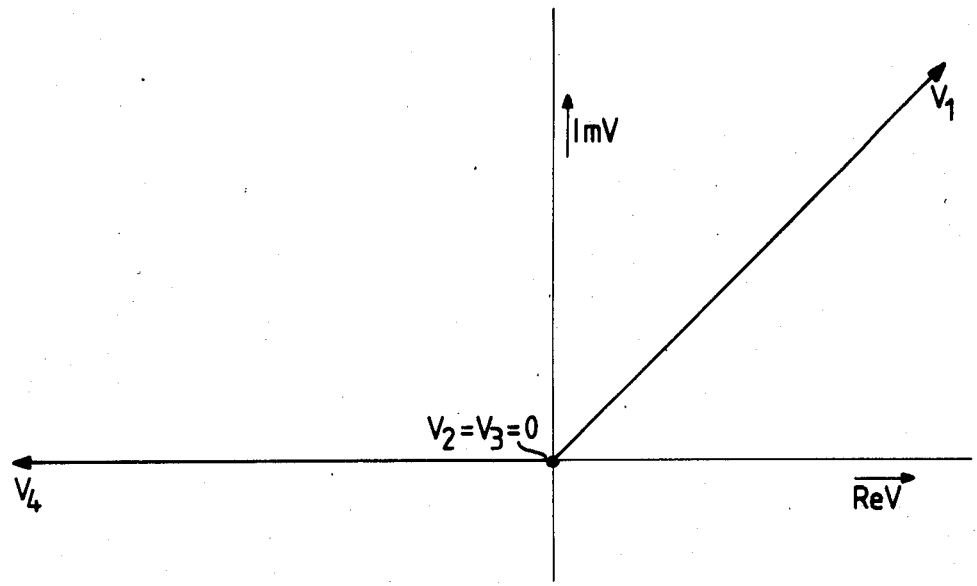
FIGS. 8A and 8B represent vector diagrams useful in explaining the specific nature of the DFT spectrum in FIG. 7E.
Figure 8B:
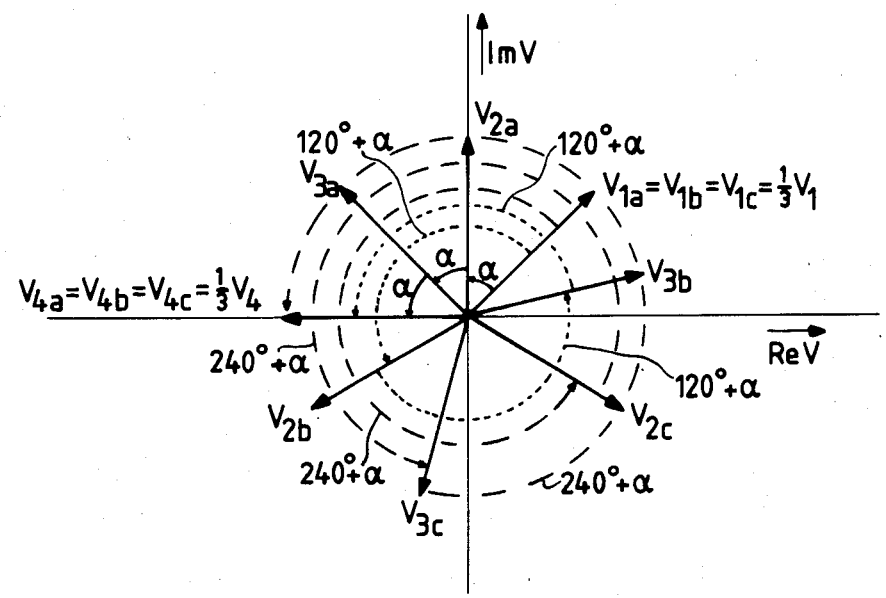

The creation of two secondary spectra in case of first-time-around echoes due to two wobbles, may be explained as follows. A train of n echo pulses P at range T, as obtained from the sampling, see FIG. 7A, results in general after an n-point DFT in a spectrum as shown in FIG. 3D. The echo pulse train of FIG. 7A may be regarded as the sum of three echo pulse trains S, Q and L, as illustrated in FIGS. 7B, 7C and 7D. The absolute value of the DFT spectrum of echo pulse train S is indicated in FIG. 7E. This gives rise to three equivalent spectra, being $\frac{1}{3}$n output channels apart; this is explained by FIG. 8A. In FIG. 8A the first four signal vectors of echo pulse train S in FIG. 7B are plotted in the complex plane, where the second and third signal vectors are the zero vector. The first signal vector $V_1$ may be regarded as the sum of three signal vectors. $V_{1a}=V_{1b}=V_{1c}=\frac{1}{3}V_1$. The same applies to $V_4$. The second and third signal vectors may be regarded as the sum of three signal vectors $V_{2a}$, $V_{2b}$, $V_{2c}$ and $V_{3a}$, $V_{3b}$, $V_{3c}$, respectively, inclined at an angle of 120° to each other, where:
$|\frac{1}{3}V_1|=|V_{2a}|=|V_{2b}|=|V_{2c}|=|V_{3a}|=|V_{3b}|=|V_{3c}|$;

see FIG. 8B.

From FIG. 8B it is seen that, if the angular difference between successive a-vectors is $\alpha°$, the angular difference between successive b-vectors is $120°+\alpha$ and that between successive c-vectors $240°+\alpha$. Hence, the difference between the successive a- and b-vectors is 120° and between successive b- and c-vectors 120° as well, corresponding with ranges of $\frac{1}{3}$n output channels between neighbouring main or secondary spectra, since the a-vectors determine the main spectrum and the b- and c-vectors the secondary spectra. The spectrum of echo pulse trains Q and L can be considered in the same way. Q and L correspond with echo pulse train S shifted over a time $\Delta T$ and $2\Delta T$, respectively. The above implies that the difference between the complex DFT spectrum of echo pulse trins S, Q and L consists of a phase difference. This can be shown in full analogy with a pulse repetition period containing one wobble.

The sum of three DFT spectra of echo pulse trains S, Q and L has to result into the DFT spectrum of FIG. 3D, i.e. the DFT spectrum of echo pulse trains S+Q+L, implying that the three complex secondary spectra compensate each other due to a 120° phase difference. The sum of the three main spectra gives the spectrum of FIG. 3D. If echo pulse trains Q and L are not shifted exactly over a distance T with respect to echo pulse train S, this means that in general the complete pulse train involves two wobbles, see FIG. 6A. The effect is a small phase shift in the complex DFT spectrum of echo pulse trains Q and L. If the three spectra of echo pulse trains, S, Q and L are added to the spectrum of the pulse train in FIG. 2A, the two sets of three secondary spectra will no longer fully compensate each other, because the phase difference of a set of these spectra is no longer exactly 120°. In this way, two small secondary spectra arise in the spectrum of the echo pulse train in FIG. 6A. The three main spectra of pulse trains S, Q and L are no longer completely in phase, giving rise to a spectrum whose magnitude is not a maximum after addition of the above three spectra. To sum up, two relatively small secondary spectra have arisen in the spectrum of the echo pulse train in FIG. 6A, while the magnitude of the main spectrum has slightly decreased. The smaller the wobble time, the smaller the change in the phase differences, the smaller the secondary spectra, the greater the main spectrum. If the wobble times are sufficiently short, the main spectrum does not change significantly. The above applies to a first-time-around echo.

In case of a second/third-time-around echo, two echoes are omitted after the recording of each echo received, since 33.3% of the echoes are detected at a range $R_1$, 33.3% at a range $R_2$, and 33.3% at a range $R_3$, where the difference in range $|R_1-R_2|$ and $|R_2-R_3|$ corresponds with the wobble time $\Delta T$ and where the difference in range $|R_1-R_3|$ corresponds with the wobble time $2\Delta T$, see FIG. 6A. The type of echo pulse train of a second/third-time-around echo thus corresponds with one of the pulse trains S, Q or L of FIG. 7. Therefore, the associated spectrum of a second/third-time-around echo corresponds with the spectrum of FIG. 7E; here the main and secondary spectra are of equal magnitude, unlike the spectrum associated with a first-time-around echo. This explains the spectra of first- and second/third-time-around echoes.

To utilise the above two additional conditions with the properties of the DFT spectrum, cluster combiner circuit 5 of the pulse radar apparatus comprises means for determining the magnitude of the local maximum values and the associated output channel number of the DFT spectrum, defined by the target-representing signal. From the range, azimuth, local maximum values and the associated output channel number of the target or targets, as determined by cluster combiner circuit 5, the classification unit 6 decides whether a target is a second/third-time-around target. The decision "target is a second/third-time-around target" is positive in the case of the detection of three targets having mutual ranges corresponding or substantially corresponding with the wobble times, having an equal or a substantially equal azimuth, and having DFT spectra in which the magnitude of the local maximum values is equal or substantially equal and in which the range differences in the output channel pertaining to the local maximum values, is equal or substantially equal to 0, $\frac{1}{3}$n or $\frac{2}{3}$n. If classification unit 6 decides that a target is a second/third-time-around target, this unit opens switch 7 to block the passage of the target-representing signal emitted by cluster combiner circuit 5 for further processing. It should be noted that $(2+3l)$ and $(3+3l)$-time-around echoes are suppressed as well, where $l=1, 2, 3, \ldots$, because the pulse repetition period corresponds with three transmitter pulses.

It will be cllear that m wobbles can be applied to the pulse repetition period, where m>2, to suppress k'-time-around echoes, where $2 < k' - l(m+1) \leq m+1$, and $l = 0, 1, 2, \ldots$, the target-representing signals in full analogy with that described above. The term $l(m+1)$ has been added, because the pulse repetition period corresponds with $(m+1)$ transmitter pulses, so that a $k' + l(m+1)$-time-around echo is suppressed in case of a $k'$-time-around echo.

However, the risk incurred is that the m+1 spectra, arising through m wobbles, may overlap, so that the important doppler information of the main spectrum will be lost. To prevent this, n should be selected sufficiently large for the n-point DFT processor.

The pulse radar apparatus according to the invention also comprises means for determining, from the DFT spectrum, information already obtained from classification unit 6 (i.e. magnitude and position of the local maximum values in the spectrum), the speed of a moving target if the target doppler frequency is greater than the average pulse repetition frequency.

If the doppler frequency of a target is equal to $2^P$ ($P \geq 0$) times the pulse repetition frequency, it is not possible to determine the doppler frequency from the associated DFT spectrum, as in such a case the doppler frequency is greater than the pulse repetition frequency (sample frequency). If however one or several wobbles are applied to the pulse repetition frequency, the value of P can be determined from the secondary spectra caused by the wobbles, even when the doppler frequency exceeds the pulse repetition frequency ($P \geq 0$). If $P < 0$, the doppler frequency is smaller than the pulse repetition frequency, and the doppler frequency can be determined directly from the DFT spectrum.

Figure 9:
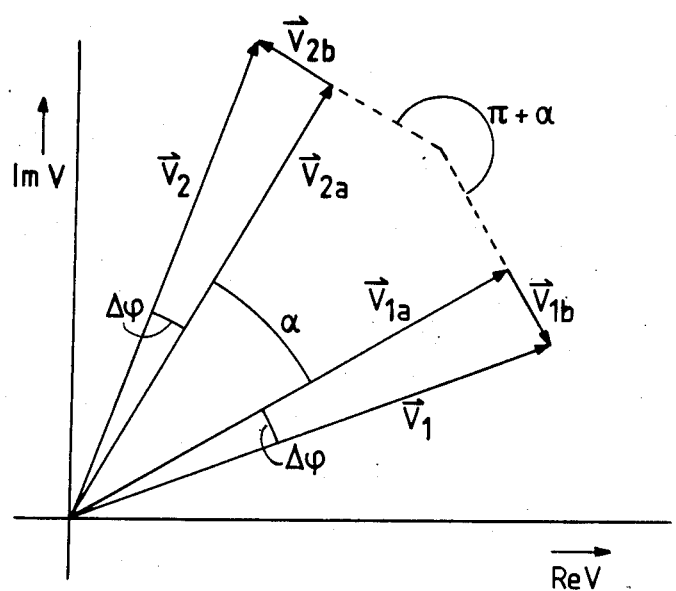
FIG. 9 is a vector diagram useful in explaining the determination of the doppler frequency of a target.

The above will be demonstrated by means of the pulse radar apparatus, whose pulse repetition period T contains one wobble. The wobble time $\Delta T = |T_1 - T_2|$. The average pulse repetition frequency $\bar{f}$ (sample frequency) equals $\frac{1}{2}(T_1^{-1} + T_2^{-1})$. In FIG. 9 two successive signal vectors $\bar{V}_1$ and $\bar{V}_2$ are plotted in the complex plane. These vectors are from an echo pulse train of a target having a doppler frequency equal to $2^P \times \bar{f}$. Signal vector $\bar{V}_1$ can be regarded as the sum of two signal vectors $\bar{V}_{1a}$ and $\bar{V}_{1b}$, as shown in FIG. 9. Also signal vector $V_2$ can be considered as the sum of two signal vectors $\bar{V}_{2a}$ and $\bar{V}_{2b}$, while $|\bar{V}_{1a}| = |\bar{V}_{1b}|$. The direction of $\bar{V}_{1a}$ and $\bar{V}_{2a}$ is equal to that of the two successive signal vectors which would have been incurred if no wobble were applied to the pulse repetition frequency; the latter vectors are equal to $|\bar{V}_1| = |\bar{V}_2|$ in magnitude and hence slightly greater than $|\bar{V}_{1a}| = |\bar{V}_{1b}|$. That is to say, signal vector $\bar{V}_{1a}$ would be sampled $\frac{1}{2}\Delta T$ sec before $\bar{V}_1$, and signal vector $\bar{V}_{2a}$ a $\frac{1}{2}\Delta T$ sec after $\bar{V}_2$. The vectors having index a therefore define the main spectrum. The difference vectors $\bar{V}_{1b}$ and $\bar{V}_{2b}$ are a direct consequence of the application of the wobble to the pulse repetition frequency; $\bar{V}_{1b}$ and $\bar{V}_{2b}$ define the secondary spectrum. The angular difference between two successive vectors having index a is equal to $\alpha$ rad. In such a case, the corresponding main spectrum will appear in or around the DFT output channel of frequency $$\frac{\alpha}{2\pi} \cdot \bar{f}.$$

The angular difference between two successive vectors having index b is equal to $(\alpha + \pi)$ rad. The corresponding secondary spectrum will appear in the DFT output channel which is at a distance of $\frac{1}{2}n$ away from the former output channel. In the complex plane the signal vectors $\bar{V}_{1a}$ and $\bar{V}_{2a}$ will have an angular velocity $\omega = 2\pi f_D$, where $f_D$ is the target doppler frequency. The angular difference $\Delta \phi$ between signal vectors $\bar{V}_{ia}$ and $\bar{V}_i$ ($i = 1, 2, \ldots$) equals:

$$\Delta \phi = 2\pi f_D \frac{\Delta T}{2} = \pi 2^P \bar{f} \Delta T.$$

The ratio Q between the magnitude of the relative maximum values of the main and secondary spectra is equal to:

$$Q = \left| \frac{V_{2b}}{V_{2a}} \right| = \left| \frac{V_{1b}}{V_{1a}} \right| = \tan\Delta\phi = \tan \pi 2^P \bar{f} \Delta T.$$

Since in practice $\Delta \phi$ is small (the secondary spectrum is small with respect to the main spectrum), a good, but non-essential approximation is that:

$$Q = \pi 2^P \bar{f} \Delta T.$$

Expressed in decibels, the ratio Q becomes:

$$Q \text{ db} = 20 \log \pi \bar{f} \Delta T + 6 \times P \text{ dB}.$$

The approximation $\tan \Delta \phi = \Delta \phi$ is permissible, as appears from the example below. If the pulse repetition frequency is alternately 800.96 Hz and 799.04 Hz, $\bar{f} = 800$ Hz and $\Delta T = 1.5 \times 10^{-6}$ s. In such a case, $Q = (-48 + 6 \times P)$dB. The corresponding value of $\Delta \phi = 2^P \times 3.77 \times 10^{-3}$, so that $\Delta \phi$ is indeed small. It is found that the ratio between the main and secondary spectra decreases by 6 dB if the target speed is doubled. The above approximation is however non-essential to the operation of the pulse radar apparatus; it concerns here a (practical) approximation, simply to illustrate the changes occurring when the target speed is doubled.

Since $\bar{f}$ and $\Delta T$ are apparatus constants, the value of P is calculable from the value of Q. In the pulse radar apparatus in question the value of Q thereto needed can simply be calculated, as the required magnitude of the local maximum values, as well as the position of the local maximum values in the DFT spectrum, has previously been determined to eliminate multiple-time-around echoes. To obtain the above values of P and Q the classification unit 6 comprises means for calculating the value of Q from the ratio between the magnitude of the main and the secondary spectra, and the value of P from the value of Q.

Figure 10:
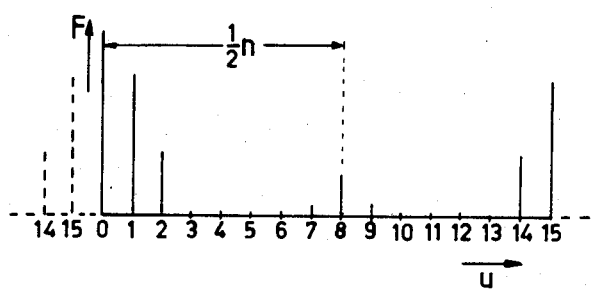
FIG. 10 represents the DFT spectrum of a target if this target moves at a speed equal to the blind speed of the pulse radar apparatus.

Classification unit 6 will proceed to the determination of P if it has previously established that the target is a first-time-around target. The value of P then calculated is supplied via line 8 for further processing (see FIG. 1). The value of P is of particular interest if $P \geq 0$, as in such a case the target doppler frequency cannot be determined from the position of the main spectrum in the DFT spectrum. If however $P < 0$, the doppler frequency is determinable from the position of the main spectrum in the DFT spectrum, as well as from the value of P. It should be noted that speeds of a target equal to one of the blind speeds of the radar apparatus are also measurable by determining P. In such a case, the main spectrum will be around the DFT output channel of frequency zero. The secondary spectrum will be in the DFT output channel numbered $\frac{1}{2}n$; see FIG. 10, where n=16.

If the pulse radar apparatus has a pulse repetition frequency containing several wobbles, the value of P can be determined as previously indicated. In such a case, $$Q = (C + a \times P) \text{dB}$$

where a and C are apparatus constants. In the case of one wobble, these constants were $-48$ and 6 for $\Delta T = 1.5 \times 10^{-6} s$ and $\bar{f} = 800$ Hz.

I claim:

1. Pulse radar apparatus provided a transmitting and receiving unit, whereby the received target echoes are sampled and digitised after detection; an n-point DFT processing unit; a threshold circuit; and a cluster combiner circuit comprising means for combining radar cells, collectively covering one single target, to form a cluster from the signals obtained from the threshold circuit, for determining a signal representing the target covered by the cluster and hence the target range and azimuth, characterised in that: the pulse repetition period of the radar apparatus contains m wobbles; the cluster combiner circuit comprises means for determining the magnitude of the local maximum values present in the DFT spectrum covered by the target-representing signal, as well as an indication which of the DFT processor output channels produces said maximum values; a classification unit connected to the cluster combiner circuit is incorporated for defining a target as being a k-time-around target subject to the conditions that: for the target-representing signals produced by the cluster combiner circuit the difference in the cluster-defined target ranges correspond or substantially correspond with a particular wobble period; the difference in azimuth of the clusters is within predefined narrow limits; the magnitudes of said local maximum values of the DFT spectra are equal or substantially equal to each other; and said local maximum values are present in either the same DFT processor output channel or output channels differing in frequency from each other a value of $(k/m)_n$ times the bandwidth of the output channels concerned, where $k = 1, 2, \ldots, m-1$.

2. Pulse radar apparatus as claimed in claim 1, characterised in that, failing to define a target as being a multiple-time-around target, the classification unit establishes, from the ratio between the magnitude of the local maximum values in the DFT spectrum, the ratio between the target doppler frequency and the average pulse repetition frequency of the pulse radar apparatus.

* * * * *